May 3, 1960 L. C. JONES 2,935,631
COMPOSITE INSULATED ELECTRICAL CONDUCTOR
AND METHOD OF FABRICATING SAME
Filed May 27, 1957 2 Sheets-Sheet 1

INVENTOR.
LOREN C. JONES
BY
Schmieding and Fultz
ATTORNEYS

May 3, 1960

L. C. JONES 2,935,631

COMPOSITE INSULATED ELECTRICAL CONDUCTOR
AND METHOD OF FABRICATING SAME

Filed May 27, 1957

INVENTOR.
LOREN C. JONES
BY
Schmieding and Fultz
ATTORNEYS

United States Patent Office 2,935,631
Patented May 3, 1960

2,935,631
COMPOSITE INSULATED ELECTRICAL CONDUCTOR AND METHOD OF FABRICATING SAME

Loren C. Jones, Columbus, Ohio, assignor, by mesne assignments, to McGraw-Edison Company, a corporation of Delaware Application May 27, 1957, Serial No. 661,749

20 Claims. (Cl. 310—208)

This invention relates to electrical conductors, such as coils and the like, and particularly to a novel construction for a coil or composite conductor, and method for fabricating same, whereby adjacently positioned coil turns or component conductors are insulated and bonded together.

The novel method of the present invention comprises, as one aspect thereof, a continuous process for treating an insulated conductor from which coils can be wound or from which composite conductors can be assembled. The method of the present invention also comprises, as another aspect thereof, an assembly and curing process whereby the treated insulated turns of a coil or components of a composite conductor are rapidly and strongly bonded together by a thermosetting material in insulated relationship and in accordance with precise overall dimensional requirements. The component conductors will remain bonded together permanently in an insulated relationship during further fabrication of the coil and normal service life of the coil.

In general, the continuous process of the method of the present invention consists of continuously drawing an electrical conductor, such as copper wire, from a source thereof, and passing same through one or more wrapping stations wherein the electrical conductor is wrapped with a fibrous material such as glass fiber yarn. If desired, the glass yarn mty contain fusible filaments or be continuously wrapped with a fusible thermoplastic material, such as Dacron or polyethylene, and subsequently heated to melt the thermoplastic material and thereby bond the wrappings of the fibrous material and add toughness to the insulation. The wrapped conductor is next passed through a wetting station wherein a solution of a polymerizable resinous composition in a solvent impregnates the fibrous wrapping. The wetted wrapped conductor is next continuously passed through a drying environment wherein the solvent is evaporated leaving a dry impregnant of polymerizable resinous composition in the interstices of and on the outer surfaces of the wrapped conductor. The wrapped and treated electrical conductor is wound on a reel for handling and storage.

In fabricating a coil or composite conductors the above described impregnated insulated conductor is rapidly and strongly bonded together to conform with precise dimensional requirements by merely curing the coil turns or assembly of adjacently positioned elements in a suitable heated confining mold or hot press die whereby the impregnant in the insulated conductor passes through a plastic phase and then polymerizes to bond the adjacent conductors. The impregnant in the conductor insulation may be adjusted so that the conductors will be bonded together only where heat and pressure is applied, such as for portions of the coil contained in the heated mold. In other portions of the coil, the application of heat will polymerize the impregnant in the conductor insulation but bonding action between adjacent conductors will not be effected.

It is therefore an object of the present invention to provide an improved composite conductor, and method of fabricating same, that includes a plurality of coil turns or component conductors insulated, one from the other, and bonded together in a novel manner to form a strong and highly efficient construction.

It is another object of the present invention to provide an improved insulated wire for fabricating electrical coils or composite electrical conductors whereby adjacently positioned components of such coils or composite conductors are rapidly bonded and molded in a dry state whereby the use of liquid coatings such as shellac or varnishes which necessitate hot and cold molding operations are eliminated from the bonding and molding stage of the process.

It is still another object of the present invention to provide a novel continuous process for insulating and treating electrical conductors for subsequent use in the fabrication of coils or composite conductors, said insulated electrical conductors being impregnated and coated with a dry polymerizable resinous material whereby insulated turns of coils or composite conductors can be rapidly and strongly bonded by merely applying heat and pressure, in a dry environment, to polymerize the coating material.

Further objects and advantages of the present invention will be apparent from the following description, reference being had to the accompanying drawings wherein a preferred form of embodiment of the invention is clearly shown.

Figure 1:
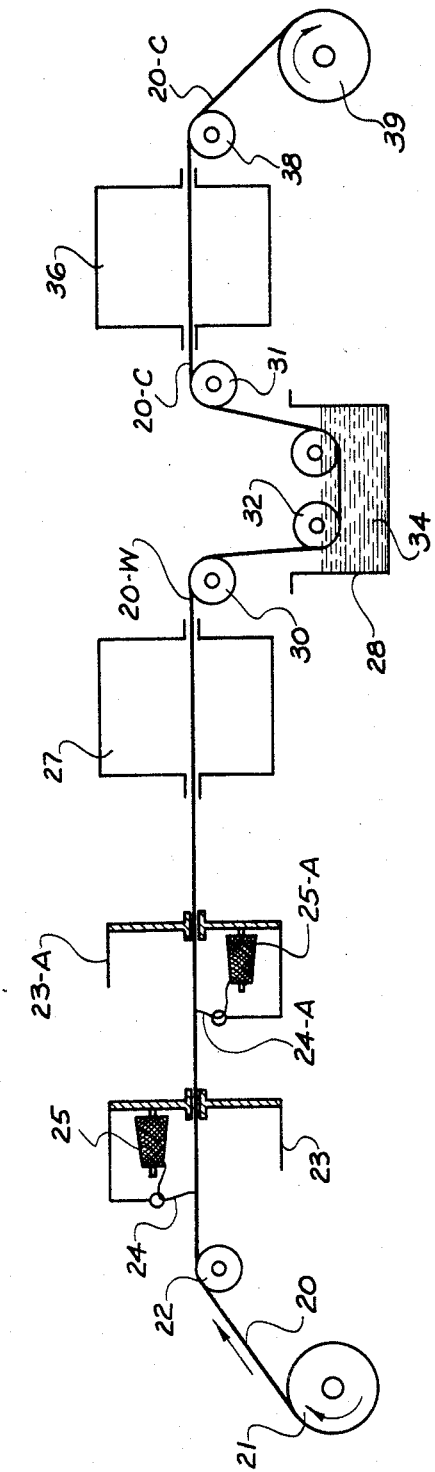
Figure 1 is a diagrammatic view of an apparatus for continuously insulating and treating conductor stock in accordance with the present invention.

Referring in detail to the drawing, Figure 1 diagrammatically illustrates an apparatus for continuously insulating and treating an electrical conductor 20, such as copper wire, that is continuously drawn from a supply such as a storage spool 21. The conductor stock 20 is first passed through one or more wrapping stations 23 and 23-A wherein strands 24 and 24-A of fibrous material from spools 25 and 25-A are wrapped around the electrical conductor 20. Fibrous material 24 and 24-A consist of glass fiber yarn or other suitable dielectric wrapping material.

If desired, a thermoplastic filament may be mixed with the fibrous material or glass yarn filaments and applied to the conductor at wrapping stations 23 and 23-A. Such thermoplastic filament may consist of Dacron or other suitable thermoplastic film material that, when subsequently heated in an oven 27, melts and bonds together the wrappings of the fibrous material 24 and 24-A into a tough insulation that is superior to the fibrous material alone, with or without conventional varnish treatments.

After the wrapped conductor 20-W leaves oven 27 it is passed through a wetting station 28 wherein the wrapped conductor moves over rolls 30 and 31 and under rolls 32 to emerse the wrapped conductor in a bath 34 consisting of a suitable liquid resinous composition.

Bath 34 may consist of any suitable resinous material in a solvent, which will leave a dry impregnant in the interstices and on the outer surfaces of the wrapped conductor 20-W after drying in oven 36. As an alternative, bath 34 may consist of a suitable resinous material which polymerizes to a "B" stage, upon heating in oven 36, to provide said dry impregnant.

As one example, bath 34 may be provided by a polyester resin in granular or powder form dissolved in a suitable solvent. If desired, suitable monomers can be included in the polyester resin bath.

A suitable bath 34 may also be provided by solid prepolymers of monomers in suitable solvents for same. A solid prepolymer of diallyl phthalate (Dapon) in acetone has been found to give excellent results, with the prepolymer of diallyl phthalate being in a twenty percent solution, by weight, with the solvent. It will be understood that prepolymers of monomers can be used with or without the addition of monomers or polyesters or combinations thereof. Also plasticizers or flexicizers may be incorporated in bath 34 to impart a desired degree of flexibility to the cured conductor insulating material.

As still another example, bath 34 may be provided by a liquid epoxy or solid epoxy resin, having a melting point above room temperature, and a suitable solvent for the resin. Using a suitable curing agent with a liquid epoxy will allow the impregnant to be cured to a "B" stage in the oven 36. Here again, plasticizers or flexicizers can be added to bath 34 if desired.

After the wrapped conductor 20-W leaves bath 34 it is coated with the liquid resinous composition and hence is designated 20-C. The conductor is next passed through a drying environment, such as is provided by an oven 36, to evaporate the solvent from the liquid coating or advance the polymerization of the impregnant to a "B" stage and leave a dry resinous material in the interstices and on the surfaces of the wrapped conductor 20-C.

After the treated conductor 20-C leaves oven 36 it is passed over a roll 38 from which it passes to a take-up reel 39.

Figure 2:
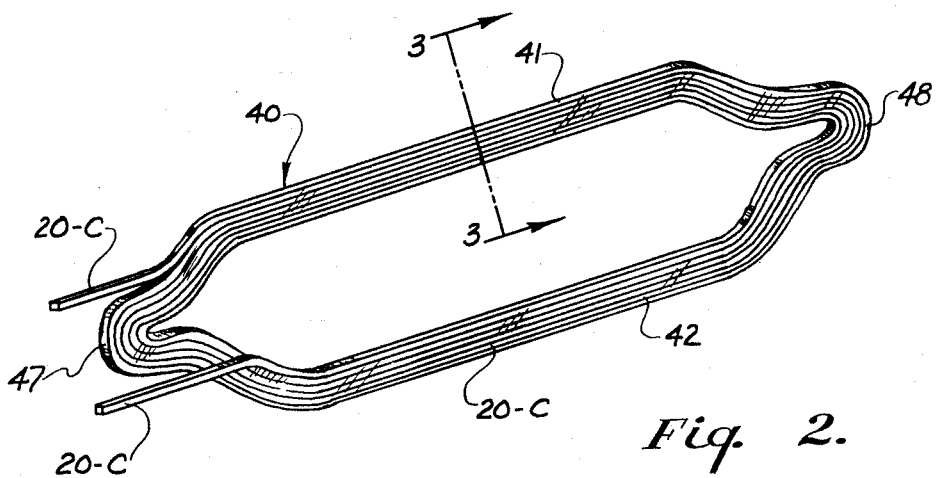
Figure 2 illustrates a typical coil for an electrical rotating machine, said coil being constructed according to the present invention.

Reference is next made to Figure 2 which illustrates a typical coil 40 for an electrical rotating machine with such coil being constructed according to the present invention. Coil 40 consists of a plurality of insulated turns wound with the previously described insulated and treated electrical conductor 20-C of Figure 1 and shaped into the coil illustrated in Figure 2. It will be noted from Figure 2 that coil 40 includes slot portions 41 and 42 and shaped end turn portions 47 and 48.

It will be understood that when coil 40 is completely insulated, by the subsequent application of wrappings of ground insulation, the slot portions 41 and 42 are installed in core slots of an electrical rotating machine, not illustrated, and that it is hence necessary to precisely establish the vertical and horizontal dimensions of the slot portions 41 and 42 of the bonded wire assembly of Figure 2 in order that a predetermined thickness of ground insulation can be applied to such slot portions so as to accurately conform with the dimensions of the core slots of the electrical rotating machine.

According to the present invention, the plurality of electrical conductors in the slot portions 41 and 42 are bonded and accurately shaped by placing each slot portion in a heated die where heat and pressure are applied whereby the polymerizable impregnant in the insulation of the conductor 20-C is heated causing the impregnant to melt and become a liquid. This causes the composition to temporarily form a liquid phase layer between not only the overlaps of the wrappings but also between confronting wrapped surfaces of adjacent conductors 20-C, Figure 3. It will therefore be understood that upon melting of the composition all of the interfaces between the strands and wrappings become thoroughly permeated and wetted. Due to the nature of the polymerizable compositions, previously described, the liquid phase layers polymerize into a solid thermosetting material to produce a monolithic structure consisting of the wrapping material and conductors.

It should be pointed out that the reason for joining together the adjacent turns of a coil or adjacent surfaces of conductors is to provide a solid uniform assembly over which ground insulation can be subsequently applied. A description and method of applying ground insulation is described in detail in my co-pending application Serial No. 642,752, filed February 27, 1957. The impregnant content in the conductor insulation may be controlled so that bonding of adjacent turns occurs only where heat and pressure are applied and not in the end turns 47 and 48. It has been found that the previously described baths 34 permit bonding of the slot portions without bonding the end turns even though the wires of the end turns touch each other.

Figure 3:
Figure 3 is a cross-sectional view through the coil of Figure 2 and a typical hot press die illustrated in perspective in Figure 4. The section is taken along a line 3—3 passing through the slot portion of the coil.

Figure 3 is a cross-sectional view through a slot portion 41 or 42 of coil 40 illustrating how heat and pressure are applied to such slot portion by a heated steel hot press die 44 to polymerize the resinous impregnant.

Figure 4:
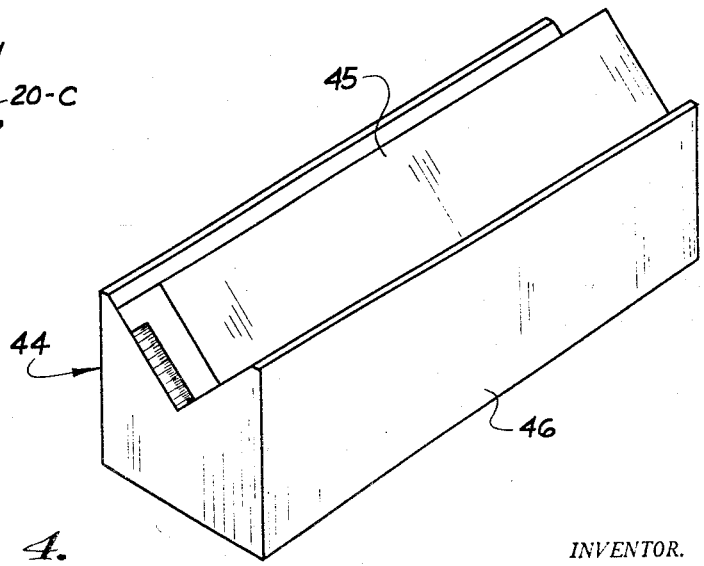

Figure 4 shows a typical hot press die for pressing and fixing the dimensions of a slot portion 41 or 42 of coil 40 while the resinous coating on conductor 20-C polymerizes to form the insulating bond between the turns of the coil. It will be noted that hot press die 44 includes die portions 45 and 46 which are retained together, after a slot portion 41 or 42 has been placed between such die portions, by suitable clamping means, not illustrated.

It will be understood that although a typical coil 40 is illustrated as an example of utilizing the method of the present invention, other forms of composite conductors, comprising adjacently positioned conducting elements, can be fabricated from the same treated conductor stock 20-C and dry bonded according to the method of the present invention.

While the form of embodiment of the present invention as herein disclosed constitutes a preferred form, it is to be understood that other forms might be adopted, all coming within the scope of the claims which follow.

I claim:
1. The steps in the method of insulating and bonding together a plurality of insulated electrical conductors which method comprises wrapping each of said conductors with a fibrous material; applying a solution of an uncured thermosetting resinous composition and a solvent to said fibrous material; evaporating said solvent to leave a dry coating of said resinous composition on said fibrous material; disposing said plurality of wrapped conductor in side by side relationship with wrapped surfaces thereof in contacting relationship; and curing said resinous composition to effect bonding together of said plurality of conductors at said contacting wrapped surfaces.

2. The steps in the method of insulating and bonding together a plurality of insulated electrical conductors which method comprises wrapping each of said conductors with a fibrous material; applying a solution of an uncured thermosetting polymerizable resinous composition and a solvent to said fibrous material; evaporating said solvent to leave a dry coating of said polymerizable resinous composition on said fibrous material; disposing said plurality of wrapped conductor in side by side relationship with wrapped surfaces thereof in contacting relationship; and applying heat to said conductors to polymerize said composition and thereby effect bonding together of said conductors at said contacting wrapped surfaces.

3. The steps in the method of insulating and bonding together a plurality of insulated electrical conductors which method comprises wrapping each of said conductors with a fibrous material; applying a solution of an uncured thermosetting polymerizable resinous composition and a solvent to said fibrous material; evaporating said solvent to leave a dry coating of said polymerizable resinous composition on said fibrous material; disposing said plurality of wrapped conductor in side by side relationship with wrapped surfaces thereof in contacting relationship; heating said assembled conductors in a heated die at a temperature sufficient to polymerize said composition to a solid state and effect bonding at said contacting wrapped surfaces; and removing said bonded conductors, while hot, from said heated die.

4. The steps in the method of insulating and bonding together a plurality of insulated electrical conductors which method comprises wrapping each of said conductors with a fibrous material and a thermoplastic filament; heating said conductors to melt said thermoplastic filament and thereby bond the wrappings of said fibrous material; applying a solution of an uncured thermosetting resinous composition and a solvent to said fibrous material; evaporating said solvent to leave a dry coating of said resinous composition on said fibrous material; disposing said plurality of wrapped conductors in side by side relationship with wrapped surfaces thereof in contacting relationship; and curing said resinous composition to effect bonding together of said plurality of conductors at said contacting wrapped surfaces.

5. The steps in the method of insulating and bonding together a plurality of insulated electrical conductors which method comprises wrapping each of said conductors with a fibrous material and a thermoplastic filament; heating said conductors to melt said thermoplastic filament and thereby bond the wrappings of said fibrous material; applying a solution of an uncured thermosetting polymerizable resinous composition and a solvent to said fibrous material; evaporating said solvent to leave a dry coating of said polymerizable resinous composition on said fibrous material; disposing said plurality of wrapped conductor in side by side relationship with wrapped surfaces thereof in contacting relationship; and applying heat to said conductors to polymerize said composition and thereby effect bonding together of said conductors at said contacting wrapped surfaces.

6. The steps in the method of insulating and bonding together a plurality of insulated electrical conductors which method comprises wrapping each of said conductors with a fibrous material and a thermoplastic filament; heating said conductors to melt said thermoplastic filament and thereby bond the wrappings of said fibrous material; applying a solution of an uncured thermosetting polymerizable resinous composition and a solvent to said fibrous material; evaporating said solvent to leave a dry coating of said polymerizable resinous composition on said fibrous material; disposing said plurality of wrapped conductors in side by side relationship with wrapped surfaces thereof in contacting relationship; heating said assembled conductors in a heated die at a temperature sufficient to polymerize said composition to a solid state and effect bonding at said contacting wrapped surfaces; and removing said bonded conductors, while hot, from said heated die.

7. A method for the continuous production of an insulated conducting means for fabricating coils or the like which method comprises continuously discharging conductor material from a supply thereof; passing said conductor through a wrapping zone wherein the outer surface of said conductor is wrapped with fibrous material; passing said wrapped conductor through a zone wherein an uncured thermosetting resinous composition in a solvent is applied to said wrapped outer surface; and passing said wrapped conductor through a drying environment to evaporate said solvent and leave a dry coating of said resinous composition on said outer surface of said conductor.

8. A method for the continuous production of an insulated conducting means for fabricating coils or the like which method comprises continuously discharging conductor material from a supply thereof; passing said conductor through a wrapping zone wherein the outer surface of said conductor is wrapped with fibrous material and thermoplastic material; passing said wrapped conductor through a heating zone to melt said thermoplastic material and bond said fibrous material; passing said wrapped conductor through a zone wherein an uncured thermosetting resinous composition in a solvent is applied to said wrapped outer surface; and passing said wrapped conductor through a drying environment to evaporate said solvent and leave a dry coating of said resinous composition on said outer surface of said conductor.

9. A method for the continuous production of an insulated conducting means for fabricating coils or the like which method comprises continuously discharging conductor material from a supply thereof; passing said conductor through a wrapping zone wherein the outer surface of said conductor is wrapped with fibrous material, passing said wrapped conductor through a zone wherein a plastic material is applied to said fibrous material; passing said wrapped conductor through a plasticizing zone to cause said plastic material to flow throughout the wrappings of said fibrous material; passing said wrapped conductor through a zone wherein an uncured thermosetting polymerizable resinous composition in a solvent is applied to said wrapped outer surface; and passing said wrapped conductor through a drying environment to evaporate said solvent and leave a dry coating of said polymerizable resinous composition on said outer surface of said conductor.

10. An improved insulated conductor for fabricating coils or the like comprising a conductor portion; fibrous material wrapped around said conductor portion; and a dry coating of an uncured thermosetting polymerizable composition applied to the outer surface of said fibrous material.

11. An improved insulated conductor for fabricating coils or the like comprising a conductor portion; fibrous material wrapped around said conductor portion; fusing material securing said fibrous material to said conductor portion; and a dry coating of an uncured thermosetting polymerizable composition applied to the outer surface of said fibrous material.

12. A composite electrical conducting means comprising a plurality of conductors; fibrous material wrapped around each of said conductors; a thermoplastic filament wrapped around each of said conductors and in fused relationship with said fibrous material and a polymerized resinous composition forming a bond between the wrappings of said conductors.

13. A composite electrical conducting means comprising a plurality of conductors; fibrous material wrapped around each of said conductors; fusing material securing said fibrous material to said conductors; and a polymerized resinous composition forming a bond between the wrappings of said conductors.

14. A composite electrical conducting means comprising a plurality of conductors; a wrapping of fibrous glass yarn around each of said conductors; a thermoplastic filament wrapped around each of said conductors in fused relationship with said yarn; and a polymerized resinous composition forming a bond between the wrappings of said conductors.

15. The steps in the method of insulating and bonding together a plurality of insulated electrical conductors which method comprises wrapping each of said conductors with a fibrous material; applying an uncured thermosetting resinous composition to said fibrous material; heating said resinous composition to leave a dry coating on said fibrous material; disposing said plurality of wrapped conductor in side by side relationship with wrapped surfaces thereof in contacting relationship; and curing said resinous composition to effect bonding together of said plurality of conductors at said contacting wrapped surfaces.

16. The steps in the method of insulating and bonding together a plurality of insulated electrical conductors of a coil having slot portions and end turns which method comprises wrapping each of said conductors with a fibrous material; applying an uncured thermosetting resinous composition to said fibrous material; heating said resinous composition to leave a dry coating on said fibrous material; heating said coil in a heated die while applying pressure only to said slot portions whereby said plurality of electrical conductors are bonded together only at said slot portions; and removing said bonded conductors, while hot, from said heated die.

17. The steps in the method of insulating and bonding together a plurality of insulated electrical conductors of a coil having slot portions and end turns which method comprises wrapping each of said conductors with a fibrous material and a thermoplastic filament; heating said conductors to fuse said fibrous material; applying an uncured thermosetting resinous composition to said fibrous material; heating said resinous composition to leave a dry coating on said fibrous material; and heating said coil while applying pressure only to said slot portions whereby said plurality of electrical conductors are bonded together only at said slot portions.

18. A coil of the type having a plurality of insulated turns, slot portions, and end turn portions, said coil comprising a wrapping of fibrous material around each of said turns, and a polymerized resinous composition forming a bond between said turns at only said slot portions.

19. A coil of the type having a plurality of insulated turns, slot portions, and end turn portions, said coil comprising a wrapping of fibrous material around each of said turns, a fusing material securing said fibrous material to said turns and a polymerized resinous composition forming a bond between said turns at only said slot portions.

20. The steps in the method of insulating and bonding together a plurality of insulated electrical conductors of a coil having slot portions and end turns which method comprises wrapping each of said conductors with a fibrous material; applying a solution of an uncured thermosetting resinous composition and a solvent to said fibrous material; evaporating said solvent to leave a dry coating of said resinous composition on said fibrous material; and heating said coil while applying pressure only to said slot portions whereby said plurality of electrical conductors are bonded together only at said slot portions.

References Cited in the file of this patent

UNITED STATES PATENTS

| | | |
|---|---|---|
| 1,306,625 | Priest | June 10, 1919 |
| 2,360,312 | Aust | Oct. 17, 1944 |
| 2,425,294 | Morgan | Aug. 12, 1947 |
| 2,504,845 | Keyes | Apr. 18, 1950 |
| 2,606,134 | Sanders | Aug. 5, 1952 |
| 2,734,934 | McKnight | Feb. 14, 1956 |
| 2,763,798 | Kriss et al. | Sept. 18, 1956 |